US007006192B2

(12) United States Patent
Ishizaki

(10) Patent No.: US 7,006,192 B2
(45) Date of Patent: Feb. 28, 2006

(54) OPTICAL ELEMENT

(75) Inventor: Koji Ishizaki, Tokyo (JP)

(73) Assignee: Dai Nippon Printing Co., Ltd., Tokyo-To (JP)

( * ) Notice: Subject to any disclaimer, the term of this patent is extended or adjusted under 35 U.S.C. 154(b) by 0 days.

(21) Appl. No.: 10/944,519

(22) Filed: Sep. 17, 2004

(65) Prior Publication Data

US 2005/0041181 A1 Feb. 24, 2005

Related U.S. Application Data

(62) Division of application No. 10/307,733, filed on Dec. 2, 2002, now Pat. No. 6,836,313.

(30) Foreign Application Priority Data

Dec. 3, 2001 (JP) .............................. 2001-368655

(51) Int. Cl.
*G02F 1/13363* (2006.01)

(52) U.S. Cl. ...................... 349/187; 349/117; 349/183; 349/193

(58) Field of Classification Search ................ 349/117, 349/122, 183–187, 193, 194; 428/1.1, 1.3; 430/20, 321
See application file for complete search history.

(56) References Cited

U.S. PATENT DOCUMENTS

| 5,654,046 | A | 8/1997 | Ninomiya et al. |
| 5,798,147 | A | 8/1998 | Beck et al. |
| 6,417,902 | B1 | 7/2002 | Greenfield et al. |
| 6,503,581 | B1 * | 1/2003 | Shibue et al. ................ 428/1.1 |
| 2002/0041352 | A1 * | 4/2002 | Kuzuhara et al. ........... 349/117 |

FOREIGN PATENT DOCUMENTS

| JP | 10-508882 A | 0/0000 |
| JP | 62-200325 | 9/1987 |
| JP | 2001-100045 | 4/2001 |

\* cited by examiner

*Primary Examiner*—Dung T. Nguyen
*Assistant Examiner*—Tai Duong
(74) *Attorney, Agent, or Firm*—Timothy J. Keefer; Seyfarth Shaw LLP

(57) ABSTRACT

The present invention provides an optical element capable of keeping the accuracy even in the case of use in an optical device such as an image display apparatus, without the risk of fluctuation of the optical characteristics even in the case a load is applied at the time of being assembled in the optical device. In order to achieve the object, an optical element comprising a supporting member, and an optical functional layer of a polymerizable liquid crystal material hardened on the supporting member with a predetermined liquid crystal regularity, wherein the optical functional layer has a 20 or more Vickers hardness value, is provided.

10 Claims, 2 Drawing Sheets

OPTICAL ELEMENT

CROSS REFERENCE TO RELATED APPLICATION

This application is a Divisional of U.S. patent application Ser. No. 10/307,733, entitled "OPTICAL ELEMENT", filed Dec. 2, 2002 now U.S. Pat. No. 6,836,313 which claims priority of Japanese patent application Ser. No. 2001-368655, filed Dec. 3, 2001.

BACKGROUND OF THE INVENTION

1. Field of the Invention

The present invention relates to an optical element having an optical functional layer obtained by polymerization of a polymerizable liquid crystal material, wherein the above-mentioned optical functional layer has a high hardness.

2. Description of the Related Art

Conventionally, an optical element such as a retardation film and a circularly polarized light control optical element, used for an image display apparatus or the like, can be used in a state assembled in an image display apparatus such as a liquid crystal display apparatus. In production of such an image display apparatus, another member can be provided by superimposing on the above-mentioned optical element. For example, in the case the optical element is a retardation film used for a liquid crystal display apparatus, or the like, a spacer (column) is formed on the retardation film for making the liquid crystal layer gap even.

At the time, in the case the hardness of the optical element itself is low, the optical element may be distorted at the time of forming the above-mentioned spacer, or the like so that the accuracy as the optical device cannot be maintained. Moreover, in the case the optical element itself is distorted by application of a slight force, the optical characteristics of the optical element are fluctuated, and thus it can be problematic.

In contrast, recently, an optical element obtained by polymerization of a polymerizable liquid crystal material has been proposed (for example, Japanese Patent Application Laid-Open (JP-A) No.2001-100045, No.10-508882, or the like). According to the optical element, since the characteristics of the liquid crystal can be used as a film by solidification by polymerization, development to various applications is expected.

However, since maintenance of the hardness of the optical element, obtained by polymerization of a polymerizable liquid crystal material, itself at a high level has not been proposed conventionally, the problems of the above-mentioned accuracy as the optical device and the fluctuation of the optical characteristics of the optical element itself have not been solved.

SUMMARY OF THE INVENTION

The object of the present invention is to provide an optical element capable of maintaining the accuracy in the case of used in an optical device such as an image display apparatus without generation of the fluctuation of the optical characteristics at the time of being assembled in an optical device even in the case a load is applied.

In order to achieve the above-mentioned object, the present invention provides an optical element comprising a supporting member and an optical functional layer of a polymerizable liquid crystal material hardened on the supporting member with a predetermined liquid crystal regularity; wherein the optical functional layer has a 17 or more Vickers hardness value; and an optical element comprising a supporting member and an optical functional layer of a polymerizable liquid crystal material hardened on the supporting member with a predetermined liquid crystal regularity; wherein the optical functional layer has a B or more pencil hardness value.

According to the present invention, since the optical functional layer has a hardness in the above-mentioned range, for example, in the case it is assembled in an optical device or the like, a problem such as deterioration of accuracy, due to deformation at the time of providing another member thereon, dose not occur. Moreover, even in the case for example a columnar spacer, for maintaining the gap of the liquid crystal layer of the liquid crystal display apparatus even, is formed on the optical element of the present invention so as to apply a partial force, since the above-mentioned high hardness is provided, locally change of the film thickness can hardly be generated so that the risk of generating fluctuation in terms of the optical characteristics due to influence of the film thickness of the optical element of the present invention can be lowered.

In the present invention, the above-mentioned supporting member may be a base material having the alignment ability. An optical element of the present invention is obtained by polymerizing a polymerizable liquid crystal material in a state having a regular liquid crystal phase. Therefore, in order to obtain a regular liquid crystal phase, it should be formed on a base material having the alignment ability, and thus it is advantageous in terms of the cost to use as it is as the optical element on the base material having the alignment ability.

In the present invention, the above-mentioned supporting member may be a base material to be transferred and the above-mentioned base material to be transferred may be a transparent substrate. In the case a specific function is necessary on the base material, or the like, an optical functional layer can be formed on the material to be transferred in a transfer step. It is preferable, in terms of the function as the optical element, to use a transparent substance as the material to be transferred at the time.

In the present invention, it is preferable that the above-mentioned polymerizable liquid crystal material is a polymerizable liquid crystal monomer, the above-mentioned predetermined liquid crystal regularity is a nematic regularity or a smectic regularity, and the above-mentioned optical functional layer is a retardation layer. In the case such an optical element having a retardation layer is used, the hardness of the retardation layer is important in terms of the accuracy, or the like.

Moreover, in the present invention, it is preferable that the above-mentioned polymerizable liquid crystal material is a polymerizable liquid crystal monomer and a polymerizable chiral agent, the predetermined liquid crystal regularity is a choresteric regularity, and the above-mentioned optical functional layer is a choresteric layer. Since such a choresteric layer, that is, a layer solidified in the state having a choresteric regularity, functions as the circularly polarized light control layer, the hardness thereof is important in terms of the accuracy also in this case.

In the present invention, it is preferable that a protection layer is formed on the above-mentioned optical functional layer. Since the hardness on the protection layer can be made higher if the optical functional layer hardness is within the above-mentioned range, as it is as the optical element even in the case the protection layer is provided, it is preferable in terms of the accuracy in the case of use in an optical device.

The present invention provides a manufacturing method for an optical element comprising a step of preparing a base material having the alignment ability; a step of forming a liquid crystal layer having a predetermined liquid crystal regularity by laminating a liquid crystal layer forming composition, comprising at least a polymerizable liquid crystal material on the base Material; a step of applying a thermal treatment to the liquid crystal layer at the N-I transition point or lower; a step of forming an optical functional layer by irradiating an active radioactive ray to the liquid crystal layer at a room temperature or while heating so as to provide an optical functional layer; and a step of re-hardening process by heating the optical functional layer at a temperature in a range of 150° C. to 260° C. for executing a re-hardening process.

According to the present invention, since there hardening process is executed at a predetermined temperature for the optical functional layer, obtained by polymerizing a polymerizable liquid crystal material, as mentioned, the hardness of the optical functional layer can be improved, and then, the accuracy can be improved when used in an optical device, or the like.

In the present invention, the above-mentioned polymerizable liquid crystal material may be a polymerizable monomer, and the predetermined liquid crystal regularity may be a nematic regularity or a smectic regularity. Such an optical functional layer serves as a retardation layer so that it can be used for various applications requiring a retardation function, such as a λ/4 retardation plate.

Moreover, in the present invention, the above-mentioned polymerizable liquid crystal material may be a polymerizable monomer and a polymerizable chiral agent, and the predetermined liquid crystal regularity may be a choresteric regularity. Such an optical functional layer maybe used as a circularly polarized light control layer and a retardation element for various applications such as a color filter.

In the present invention, it is preferable that a photo polymerization initiating agent is contained in the above-mentioned liquid crystal layer forming composition. As mentioned, since the photo polymerization initiating agent is contained, the hardness can be raised effectively in the re-hardening process step.

In the present invention, it is preferable that the above-mentioned re-hardening process step is carried out under a non-oxygen atmosphere. Under the non-oxygen atmosphere, the hardness can be raised effectively. Here, the non-oxygen atmosphere is preferably a nitrogen atmosphere as mentioned in claim 1. It is the method most commonly used for having a non-oxygen atmosphere and it is also advantageous in terms of the cost.

In the present invention, it is preferable that the above-mentioned liquid crystal layer forming composition is a liquid crystal layer forming coating solution using a solvent. Such a method using a liquid crystal layer forming coating solution can easily be carried out in the step compared with the other methods such as a method of forming a dry film and a method of melting and coating.

In the present invention, it is preferable that the heating time for the above-mentioned re-hardening process is within a range of 1 minute to 240 minutes. It is preferable to heat within the above-mentioned range of time, from the viewpoint of raising the hardness.

In the present invention, it is preferable that a transfer step for transferring the above-mentioned optical functional layer, formed on the base material having the alignment ability, onto the material to be transferred is provided after the optical functional layer forming step. For example in the case the optical functional layer is necessary on the material to be transferred having another function, or the like, the transfer step for transferring the optical functional layer on the material to be transferred can be carried out as well. In this case, by executing the above-mentioned re-hardening process step after the transfer, the hardness of the optical functional layer on the material to be transferred can be raised.

In the present invention, it is preferable that a protection layer forming step is executed after the above-mentioned optical functional layer forming step, and then a re-hardening process step is executed. By executing the re-hardening process step together with the protection layer, the hardness of the optical functional layer and the protection layer can be raised so that the accuracy can be improved at the time of use in an optical device.

According to the present invention, since the hardness of the optical functional layer is a high hardness in a predetermined range, even in the case it is assembled in an optical device, or the like, generation of a problem such as the accuracy deterioration due to deformation at the time of providing another member thereon, or the like can be prevented. Moreover, also in the case a columnar spacer is formed on the optical element of the present invention for example for evenly maintaining a gap of the liquid crystal layer of a liquid crystal display apparatus, so as to locally apply a force, since the hardness is provided as mentioned above, the local change of the film thickness can hardly be generated, and thus an effect of reducing the risk of the optical characteristic fluctuation of the optical element of the present invention can be achieved.

DESCRIPTION OF THE PREFERRED EMBODIMENTS

Figure 1A:
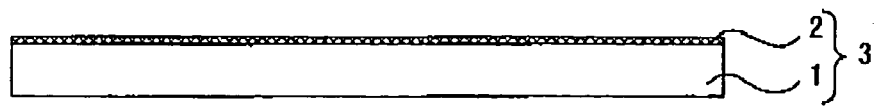
FIG. 1 is a diagram showing steps of an embodiment of a manufacturing method for an optical element according to the present invention.

Hereinafter, after explaining an optical element of the present invention, a manufacturing method for an optical element for obtaining such an optical element will be explained.

A. Optical Element

An optical element according to the present invention comprises a supporting member and an optical functional layer of a polymerizable liquid crystal material hardened on the supporting member with a predetermined liquid crystal regularity, wherein the optical functional layer has a 17 or more Vickers hardness value, or a B or more pencil hardness value.

According to the present invention, since the hardness of the optical functional layer is in the above-mentioned range, the following advantages can be provided.

That is, in the case an optical element of the present invention is assembled in an optical device, or the like, since it has the above-mentioned hardness, deformation of the optical functional layer can hardly be generated in the case another member is provided on the optical functional layer of the optical element of the present invention, and thus the position accuracy of the member formed thereon can be maintained at a high level. Moreover, even in the case a load is applied on the optical element of the present invention, since the above-mentioned hardness is provided, the film thickness fluctuation can hardly be generated. Thereby, fluctuation of the various optical characteristics, derived from the film thickness of the optical element, such as the retardation value can be minimized so that an advantage of minimizing the fluctuation of the characteristics of the optical element can be provided.

As to the method for having the hardness of the optical functional layer in an optical element of the present invention in the above-mentioned range, for example, a method of providing the re-hardening process step in the production steps, as described later, can be presented. But it is not limited thereto, and an optical element having the above-mentioned hardness can be provided as well by selecting the polymerizable liquid crystal material.

Hereinafter, such an optical element will be explained per each factor.

1. Supporting Material

The supporting member in the present invention refers to a base material having the alignment ability or a material to be transferred, in the case an optical functional layer is transferred in a transfer step.

(Base Material Having the Alignment Ability)

An optical element of the present invention comprises an optical functional layer formed by hardening a polymerizable liquid crystal material with a predetermined liquid crystal regularity on a base material having the alignment ability.

As such a base material having the alignment ability, a base material itself having the alignment ability and a base material provided with an alignment layer formed on a transparent substrate so as to serve as a base material having the alignment ability can be presented. Hereinafter, each of them will be explained as a first embodiment and a second embodiment.

a. First Embodiment

This embodiment is an embodiment with a base material itself having the alignment ability. Specifically, the case of the base material is an oriented film can be presented. By using the oriented film, a liquid crystal material can be oriented along the drawing direction thereof. Therefore, since the base material can be prepared simply by preparing a oriented film, it is advantageous in that the step can be carried out extremely simply. As such an oriented film, a commercially available oriented film can be used. Moreover, as needed, oriented films of various kinds of materials can be formed as well.

Specially, films made of thermoplastic polymers such as a polycarbonate based polymer, a polyester based polymer including a polyallylate and a polyethylene terephthalate, a polyimide based polymer, a polysulfone based polymer, a polyether sulphone based polymer, a polystyrene based polymer, a polyolefin based polymer including a polyethylene and a polypropylene, a polyvinyl alcohol based polymer, a cellulose acetate based polymer, a polyvinyl chloride based polymer and a polymethyl methacrylate based polymer, films made of a liquid crystal polymer, or the like can be presented.

In the present invention, among these examples, a polyethylene terephthalate (PET) film can be used preferably for its wide range width of the drawing ratio, easy accessibility, or the like.

The drawing ratio of oriented film used in the present invention is not particularly limited as long as it is a drawing ratio to the extent the alignment ability can be provided. Therefore, a biaxial oriented film can be used as well as long as it has different drawing ratios between the two axes.

The drawing ratio differs largely depending on the material to be used, and thus it is not particularly limited. In general, those having about a 150% to 300% ratio can be used. Preferably, those having a 200% to 250% can be used.

b. Second Embodiment

The second embodiment is an embodiment with a base material having the above-mentioned alignment ability comprises a transparent substrate and an alignment layer formed on the transparent substrate.

This embodiment is advantageous in that the alignment direction can be selected in a relatively wide range according to the selection of the alignment layer. By selecting the kind of the alignment layer forming coating solution to be coated on the transparent substrate, various alignment directions can be realized as well as further effective orientation can be achieved.

As the alignment layer used in this embodiment, an alignment layer ordinarily used in a liquid crystal display apparatus, or the like can be used preferably. In general, a polyimide based alignment layer with a rubbing process applied can be used preferably. Moreover, an optical alignment layer can be used as well.

Furthermore, the transparent substrate used in this embodiment is not particularly limited as long as it is one made of a transparent material. For example, a transparent rigid material without flexibility such as a quartz glass, a PYREX (registered trade mark) glass and a synthetic quartz plate, and a transparent flexible material having flexibility such as a transparent resin film and an optical resin plate can be used.

(Material to be Transferred)

The material to be transferred used in the present invention can be selected suitably according to the application of the optical element. In general, since it is an optical element, a transparent material, that is, a transparent substrate can be used preferably.

Since the transparent substrate is same as those explained in the above-mentioned description for the "base material having the alignment ability", further explanation is omitted here.

2. Optical Functional Layer

An optical element of the present invention comprises an optical functional layer of a polymerizable liquid crystal material hardened on the above-mentioned base material with a predetermined liquid crystal regularity. For such an optical functional layer, a polymerizable liquid crystal material comprising a polymer having a liquid crystal regularity is used as the raw material. Hereinafter, these components will be explained.

(Polymerizable Liquid Crystal Material)

As the polymerizable liquid crystal material used in the present invention, a polymerizable liquid crystal monomer, a polymerizable liquid crystal oligomer and a polymerizable liquid crystal polymer can be presented. As such a polymerizable liquid crystal material, in general, those having a nematic regularity or a smectic regularity themselves are used, but it is not limited thereto, and a polymerizable liquid crystal material having a choresteric regularity can be used as well. Moreover, in the case a choresteric regularity is needed for the optical element and the above-mentioned polymerizable liquid crystal material itself has a nematic regularity or a smectic regularity, a polymerizable chiral agent can further be used for providing the choresteric regularity. Hereinafter, each component will be explained.

(1) Polymerizable Liquid Crystal Material

As a polymerizable liquid crystal material used in the present invention, as mentioned above, a polymerizable liquid crystal monomer, a polymerizable liquid crystal oligomer, a polymerizable liquid crystal polymer, or the like can be presented. The polymerizable liquid crystal material is not particularly limited as long as it is a polymerizable liquid crystal material capable of forming the liquid crystal phase having a nematic regularity, a smectic regularity or a choresteric regularity in the case a liquid crystal phase is formed only thereby.

As an example of such a polymerizable liquid crystal material, for example, a compound (I) represented by the below-mentioned general formula (1) can be presented. As the compound (I), a mixture of two kinds of compounds represented by the general formula (1) can be used as well. Furthermore, a compound comprising the above-mentioned compound (I) and a compound (II) represented by the below-mentioned general formula (2) can be used.

As the compound (I), a mixture of two kinds of compounds represented by the general formula (1) can be used. Similarly, as the compound (II), a mixture of two or more kinds of compounds represented by the general formula (2) can be used.

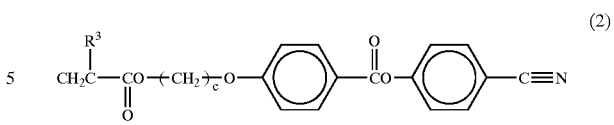

In the general formula (2) representing the compound (II), $R^3$ represents a hydrogen or a methyl group, however, $R^3$ is preferably a hydrogen for the width of a temperature range providing a liquid crystal phase. As to c representing the chain length of the alkylene group, a compound (II) having a 2 to 12 value thereof does not provide the liquid crystal property. However, in consideration of the compatibility with the compound (I) having the liquid crystal property, c is preferably in a range of 4 to 10, more preferably in a range of 6 to 9. The compound (II) can be synthesized by an optional method. For example, a compound (TI) can be synthesized by the esterification reaction of 1 equivalent of a 4-cyano phenol and 1 equivalent of a 4-(n-(meth) acryloyloxy alkoxy)benzoic acid. Similar to the case of synthesizing the compound (I), the esterification reaction is general carried out by activating the above-mentioned benzoic acid by an acidic chloride or a sulfonic acid anhydride, and reacting the same with a 4-cyano phenol. Moreover, it is also possible to react the above-mentioned benzoic acid and a 4-cyano phenol using a condensing agent such as a DCC (dicyclo hexyl carbodiimide), or the like.

Although an example of a polymerizable liquid crystal monomer has been presented in the above-mentioned embodiment, in the present invention, a polymerizable liq-

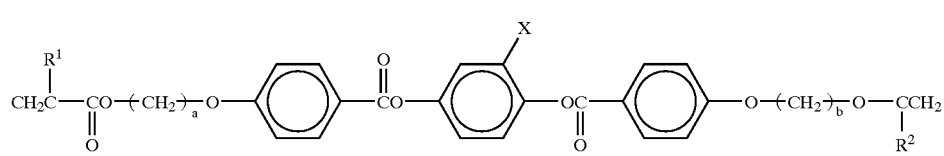

In the general formula (1) representing the compound (I), $R^1$ and $R^2$ each represent a hydrogen or a methyl group, however, $R^1$ and $R^2$ are preferably both a hydrogen for the width of a temperature range providing a liquid crystal phase. X may be any of a hydrogen, a chlorine, a bromine, an iodine, an alkyl group having 1 to 4 carbon atoms, a methoxy group, a cyano group and a nitro group, but it is preferably a chlorine or a methyl group. Moreover, a and b representing the chain length of the (meth) acryloyloxy group at the both ends of the molecular chain of the compound (I) and the alkylene group as the spacer with an aromatic ring may each independently be an optional integer in a range from 2 to 12, and it is preferably in a range of 4 to 10, more preferably in a range of 6 to 9. A compound of the general formula (1), wherein a=b=0 has a poor stability so as to easily be hydrolyzed, and furthermore, the crystalline property of the compound itself is high. Furthermore, a compound of the general formula (1), wherein each of a and b are 13 or more, has a low isotropic transition temperature (TI). From these reasons, these compounds have a narrow temperature range providing the liquid crystal property, and thus they are not preferable.

uid crystal oligomer, a polymerizable liquid crystal polymer, or the like can be used as well. As the polymerizable liquid crystal oligomer and the polymerizable liquid crystal polymer, those conventionally proposed can be selected and used optionally.

(2) Chiral Agent

In the present invention, in the case the above-mentioned optical element is a circularly polarized light control optical element, that is, in the case it comprises the optical functional layer as a choresteric layer and the polymerizable liquid crystal material having a nematic regularity or a smectic regularity, in addition to the above-mentioned polymerizable liquid crystal material, a chiral agent is need to be added.

The chiral agent used in the present invention denotes a low molecular weight compound having an optically active part of a 1,500 or less molecular weight. The chiral agent is used mainly, for example, for inducing a spiral pitch in a positive uniaxial nematic regularity in the polymerizable liquid crystal material represented by the compound (I) or the compound (II) used as needed. As long as the purpose is achieved, one compatible with a polymerizable liquid crystal material, such as a compound (I), or a mixture of a compound (I) and a compound (II) in a solution state or in a molten state, without the risk of deteriorating the liquid crystal property of the polymerizable liquid crystal material capable of having the above-mentioned nematic regularity and inducing a desired spiral pitch thereto can be used, and the kind of the low molecular weight compound as the chiral agent shown below is not particularly limited. It is essential that the chiral agent used for inducing a spiral pitch in the liquid crystal has at least any chirality in a molecule. Therefore, as the chiral agent usable in the present invention, for example, a compound having one asymmetric carbon, or two or more asymmetric carbons, a compound having an asymmetric point on a hetero atom such as a chiral amine and a chiral sulfoxide, or a compound having an axial asymmetry such as a cumulene and a binaphthol can be presented. More specifically, a commercially available chiral nematic liquid crystal, such as S-811 produced by Merck Corp., or the like can be presented.

However, depending upon the nature of the selected chiral agent, there are the risks of destruction of the nematic regularity formed by a polymerizable liquid crystal material, presented as a compound (I) or a mixture of a compound (I) and a compound (II), or deterioration of orientation, in the case the compound is non-polymerizable, deterioration of the hardening property of the liquid crystal composition or deterioration of the reliability of a hardened film may be brought about. Furthermore, use of a chiral agent having an optically active part by a large amount arises cost increase of the composition. Therefore, in the case of producing a circularly polarized light control optical element having a short pitch choresteric regularity, as the chiral agent having an optically active part to be contained in a polymerizable liquid crystal material used in the present invention, it is preferable to select a chiral agent having a large effect of inducing a spiral pitch. Specifically, it is preferable to use a low molecular weight compound (III) having an axial asymmetry in a molecular represented by the general formula (3) or (4).

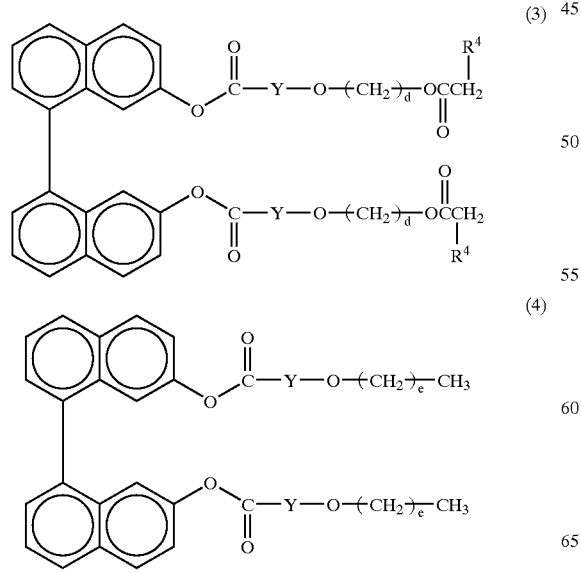

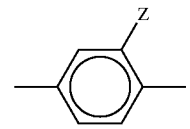 (i)

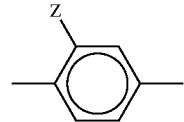 (ii)

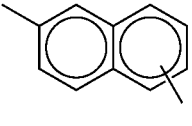 (iii)

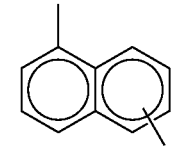 (iv)

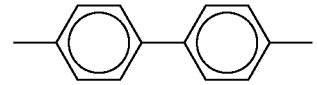 (v)

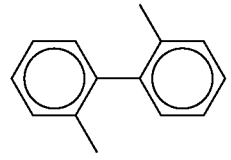 (vi)

 (vii)

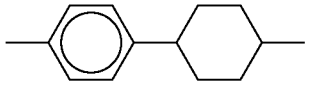 (viii)

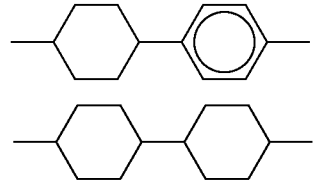 (ix)

(x)

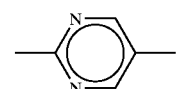 (xi)

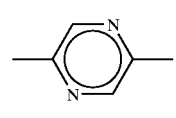 (xii)

 (xiii)

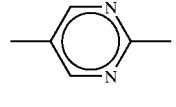 (xiv)

-continued

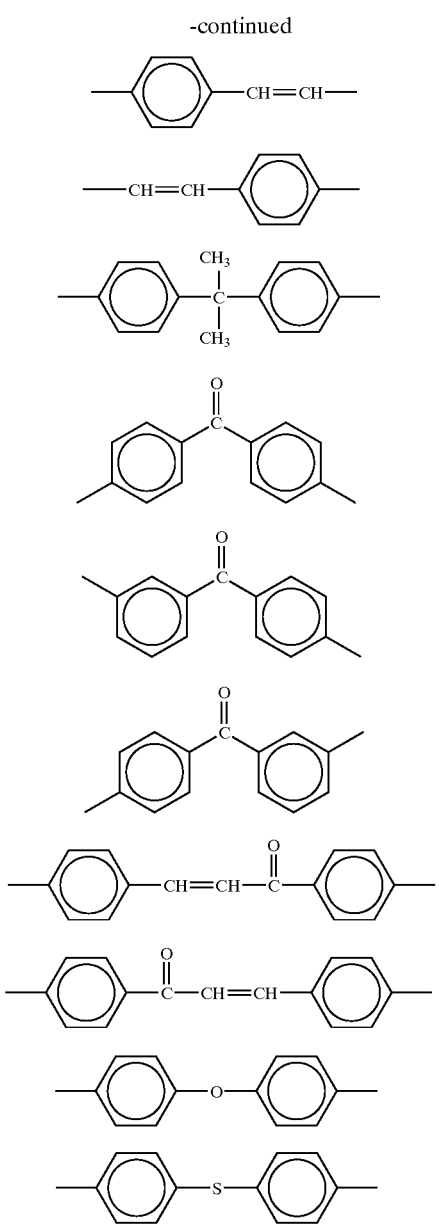

In general formula (3) or (4) representing the chiral agent (III), $R^4$ represents a hydrogen or a methyl group. Y is optional one of the above-mentioned formulae (i) to (xxiv). Among them, it is preferably one of the formulae (i), (ii), (iii), (v) and (vii). Moreover, d and e representing the chain length of the alkylene group may each independently be an optional integer in a range from 2 to 12, and it is preferably in a range of 4 to 10, more preferably in a range of 6 to 9. A compound represented by the general formula (3) or (4), wherein the value of d or e is 0 or 1 has a poor stability so as to easily be hydrolyzed, and a high crystalline property. In contrast, a compound having the value of d or e of 13 or more has a low melting point (Tm). According to these compounds, the compatibility with the compound (I) having the liquid crystal property, or that with a mixture of the compound (I) and the compound (II) is lowered. Furthermore, depending upon the concentration, the phase separation, or the like may be brought about.

As to the amount of the chiral agent provided in a polymerizable liquid crystal material of the present invention, the optimum value is determined in consideration of the spiral pitch inducing ability and the choresteric property of the circularly polarized light control optical element to be finally obtained. Specifically, although it differs largely depending upon the used polymerizable liquid crystal material, it is selected in a range of 0.01 to 60 parts by weight per the total amount of 100 parts by weight of the polymerizable liquid crystal material, preferably 0.1 to 40 parts by weight, more preferably 0.5 to 30 parts by weight, most preferably 1 to 20 parts by weight. In the case the amount is smaller than the above-mentioned range, a sufficient choresteric property may not be provided to the polymerizable liquid crystal material. In contrast, in the case it is larger than the above-mentioned range, the molecular orientation may be inhibited so that the risk of posing a harmful effect at the time of hardening with an active radioactive ray.

According to the present invention, it is not essential that such a chiral agent has a polymerizable property. However, in consideration of the thermal stability, or the like, of the optical functional layer to be obtained, it is preferable to use a polymerizable chiral agent capable of polymerizing with the above-mentioned polymerizable liquid crystal material so as to fix the choresteric regularity.

(3) Adjustment of the Hardness

According to the present invention, it is characteristic that the optical functional layer obtained by hardening the above-mentioned polymerizable liquid crystal material has the hardness in a predetermined range. As a method for obtaining the hardness, in addition to the method of executing are hardening process step later described, it can be executed by selecting the polymerizable liquid crystal material, as well.

As above-mentioned method for obtaining the hardness, that is, in order to obtain a high-hardness optical functional layer, for example, a method of having the glass transition point (Tg) of the polymer, obtained after the polymerization, at 120° C. or more, a method of using a polymerizable liquid crystal material having two or more functional groups, and a method of using a polymerizable liquid crystal material having the molecular weight in a range of 300 to 1,500, or the like can be presented. The number of the functional groups in the above-mentioned polymerizable material is preferably 5 or less. In the case a polymerizable liquid crystal material having more than 5 functional groups is used, the polymer to be obtained may be unstable and vulnerable.

(Photo Polymerization Initiating Agent)

In the present invention, it is preferable that a photo polymerization initiating agent is added to the above-mentioned polymerizable liquid crystal material. For example, at the time of polymerizing a polymerizable liquid crystal material by the electron beam irradiation, the photo polymerization initiating agent may not be necessary. However, in the case of hardening by generally used ultraviolet ray (UV) irradiation, a photo polymerization initiating agent is commonly used for promoting the polymerization.

As a photo polymerization initiating agent usable in the present invention, a benzyl (also called a bibenzoyl), a benzoin isobutyl ether, a benzoin isopropyl ether, a benzo phenone, a benzoyl benzoic acid, a benzoyl methyl benzoate, a 4-benzoyl-4'-methyl diphenyl sulfide, a benzyl methyl ketal, a dimethyl amino methyl benzoate, a2-n-buthox yethyl-4-dimethyl amino benzoate, a p-dimethyl amino isoamyl benzoate, a 3,3'-dimethyl-4-methoxybenzophenone, a methyl benzoyl formate, a 2-methyl-1-(4-

(methyl thio)phenyl)-2-morpholino propane-1-on, a 2-benzyl-2-dimethyl amino-1-(4-morpholino phenyl)-butane-1-on, a 1-(4-dodecyl phenyl)-2-hydroxy-2-methyl propane-1-on, a 1-hydroxy cyclohexyl phenyl ketone, a 2-hydroxy-2-methyl-1-phenyl propane-1-on, a 1-(4-isopropyl phenyl)-2-hydroxy-2-methyl propane-1-on, a 2-chloro thioxanthone, a 2,4-diethyl thioxanthone 2,4-diisopropyl thioxanthone, a 2,4-dimethyl thioxanthone, a isopropyl thioxanthone, a 1-chloro-4-propoxy thioxanthone, or the like can be presented. It is also possible to add a sensitizing agent in addition to the photo polymerization initiating agent in a range without deteriorating the purpose of the present invention.

As to the amount of such a photo polymerization initiating agent, it can be added to the polymerizable liquid crystal material of the present invention in a range of, in general 0.01% by weight to 20% by weight, preferably 0.1% by weight to 10% by weight, more preferably 0.5% by weight to 5% by weight.

(Liquid Crystal Regularity)

In the present invention, an optical functional layer of the above-mentioned polymerizable liquid crystal material hardened with a predetermined liquid crystal regularity can be used.

Here, the liquid crystal regularity includes a nematic regularity, a smectic regularity and a choresteric regularity In the case the optical element is a retardation layered product, the above-mentioned optical functional layer has a nematic regularity or a smectic regularity. In contrast, in the case the optical element is a circularly polarized light control optical element, it has a choresteric regularity.

The above-mentioned regularity is determined basically by the liquid crystal regularity of the used polymerizable liquid crystal material itself and whether or not a chiral agent is used.

Such a liquid crystal regularity can be obtained by forming a liquid crystal layer of the above-mentioned polymerizable liquid crystal material and the polymerizable chiral agent added as needed on a base material having the alignment ability, and orienting along the alignment ability of the base material. By hardening by the active radioactive ray irradiation in the state having the liquid crystal regularity, an optical functional layer hardened in the state having the liquid crystal regularity can be obtained.

3. Hardness of the Optical Functional Layer

In the present invention, it is characteristic that the above-mentioned optical functional layer has a high hardness. In the present invention, the hardness is defined by two measuring methods. Hereinafter, each of them will be explained.

(Vickers Hardness)

In the present invention, it is characteristic that the hardness of the above-mentioned optical functional layer is 17 or more in the Vickers hardness value. It is preferably 35 or more, more preferably 50 or more. The upper limit value of the hardness is not particularly limited, but it may be 1,000 or less.

The Vickers hardness value in the present invention is a value measured by the below-mentioned measuring method and measuring condition. That is, it is a value measured by a method of using a surface film physical property tester (film hardness meter, such as a Fischer's scope H100VP-HCU X-Y PROG produced by H. FISCHER Corp.), the load is increased for 5 seconds by 1 mN/sec, maintaining for 5 seconds at the maximum load of 5 mN, and then reducing the load by 1 mN/sec.

(Pencil Hardness)

In the present invention, it is characteristic that the pencil hardness value is B or more. It is preferably HB or more, more preferably H or more. The upper limit of the hardness is not particularly limited, but it may be 8H or less.

The pencil hardness value in the present invention is a value measured by the measuring method and measuring condition described in the JIS K5400, 8.4 "pencil scratching value". That is, it is a method of placing a pencil in a pencil scratching film hardness tester (such as No. 431 (trade name) produced by Toyo Seiki Seisaku-Sho, Ltd.), scratching the film as the test piece so as to provide a flaw, repeating the same for 5 times with a pencil of the same hardness, and evaluating the hardness mark of the pencil hardness lower by one stag, than the pencil hardness for forming a flaw by two or more times on the test pieces, as the pencil hardness of the test piece.

4. Specific Examples of the Optical Element

As the specific examples of the optical element of the present invention, a retardation layered product in the case the optical functional layer is a retardation layer, and a circularly polarized light control optical element in the case the optical functional layer is a choresteric layer can be presented. Hereinafter, each of them will be explained.

(Retardation Layered Product)

As the case the optical functional element is a retardation layered product, in the present invention, it comprises a supporting member, and a retardation layered product having a retardation layer of a polymerizable liquid crystal material hardened on the above-mentioned supporting member with a nematic regularity or a smectic regularity, wherein the retardation layer as the optical functional layer has the hardness in the above-mentioned range.

Accordingly, since the retardation layer as the above-mentioned high hardness even in the case the optical element of the present invention is used as a retardation layered product, the positioning accuracy can be maintained at a high level at the time of laminating another member on the retardation layer as mentioned above in the case the same is used for an optical device such as an image display apparatus so that the accuracy of the optical device can be improved so as to achieve a high quality.

(Circularly Polarized Light Control Optical Element)

In the case the optical element is a circularly polarized light control optical element, in the present invention, it is a circularly polarized light control optical element comprising a supporting member, and a choresteric layer of a polymerizable liquid crystal material hardened on the supporting member with a choresteric regularity, wherein the optical functional layer has the hardness in the above-mentioned range.

Also in this case, similarly to the case of the above-mentioned retardation layered product, since the choresteric layer as the optical functional layer has the above-mentioned hardness, in the case it is used for an optical device, a high accuracy and a high quality can be achieved.

5. Others

In an optical element of the present invention, a protection layer may be formed on the above-mentioned optical functional layer. At the time, in the present invention, in the state with a protection layer laminated on the above-mentioned optical functional layer by a 5 μm or less film thickness, preferably 3 m or less film thickness, the Vickers hardness value measured at the protection layer surface is preferably 30 or more, more preferably 50 or more, particularly preferably 70 or more.

In the case the hardness in the above-mentioned range is provided in the state with the protection layer laminated on the optical functional layer, a high accuracy can be achieved in the case such an optical element is used for an optical device for the same reason as explained for the above-mentioned optical functional layer hardness.

Such a protection layer is not particularly limited, but it is preferably one formed with an organic material. As particularly preferable materials, a thermosetting resin having the excellent pressure resistance, wear resistance and thermal resistance, such as an ultraviolet ray hardening resin and an electron beam hardening resin can be presented. Since the ultraviolet ray hardening resin and the electron beam hardening resin form a film by the polymerization reaction of a polyfunctional monomer and a polyfunctional oligomer, a strong surface protection layer with a high mechanical strength can be provided. As the specific materials used for the surface protection layer of the present invention, a polyfunctional oligomer having 1 to 10 functional groups such as a polyester acrylate, a polyester methacrylate, a polyether acrylate, a polystyryl methacrylate, a polyether methacrylate, a urethane acrylate, an epoxy acrylate (in particular, an epoxy acrylate each having a bisphenol A type, bisphenol F type, or bisphenol S type skeleton and a phenol novolak type epoxy acrylate), a polycarbonate, a polybutadiene acrylate, a silicone acrylate and a melamine acrylate, or the like can be presented. Moreover, a monofunctional monomer and a polyfunctional monomer such as a 2-ethyl hexyl acrylate, a cyclohexyl acrylate, a phenoxy ethyl acrylate, a 1,6-hexane diol acrylate, and a tetraethylene glycol diacrylate can also be presented as preferable examples. Furthermore, a surface protection layer laminated in a plurality of stages can be formed by combining these materials in various ways. Specifically, AC-6100, AC-5100 (Nissan Chemical Industries, Ltd.), or the like can be presented.

The Vickers hardness value of the protection layer as a simple substance used in the present invention is preferably in a range of 17 to 1,000, particularly preferably in a range of 50 to 700, and the pencil hardness is preferably in a range of HB to 9H, particularly preferably in a range of H to 5H. In the case the hardness is lower than the above-mentioned range, it is difficult to provide the above-mentioned preferable hardness in the case of laminating on the optical functional layer as mentioned above. In contrast, a protection layer having the hardness higher than the above-mentioned range is difficult in handling in many cases. Moreover, the protection layer should have a hardness higher than that of the optical functional layer.

The measuring method and condition of the Vickers hardness value in this column is as mentioned above, and thus further explanation is omitted here.

B. Manufacturing Method for the Optical Element

A manufacturing method for an optical element of the present invention comprises:

a step of preparing a base material having the alignment ability, a step of forming a liquid crystal layer having a predetermined liquid crystal regularity by laminating a liquid crystal layer forming composition comprising at least a polymerizable liquid crystal material on the base material, a step of applying a thermal treatment to the liquid crystal layer at the N-I transition point or lower, a step of forming an optical functional layer by irradiating an active radioactive ray to the liquid crystal layer at a room temperature or while heating so as to provide an optical functional layer, and a step of re-hardening process by heating the optical functional layer at a temperature in a range of 150° C. to 260° C. for executing a re-hardening process.

According to the manufacturing method for an optical element of the present invention, after forming a liquid crystal layer by laminating a liquid crystal layer forming composition comprising a polymerizable liquid crystal material on a base material and irradiating an active radioactive ray thereto for hardening the polymerizable liquid crystal material in the liquid crystal layer, a re-hardening process step of a thermal treatment in the above-mentioned temperature is carried out. By this re-hardening process, the hardness of the optical functional layer is raised so as to provide a high hardness.

The improvement of the hardness of the optical functional layer by the re-hardening process step of the present invention is presumed to be because of the following reason although it is not clear. That is, a functional group not completely polymerized only by the active radioactive ray irradiation in the above-mentioned optical functional layer forming step can be polymerized completely in the re-hardening process step. Thereby, the hardness is presumed to have been raised.

Moreover, after the above-mentioned optical functional layer forming step, the residue of the photo polymerization initiating agent, or the like may be included in the optical functional layer. It can be pointed out that this can be eliminated by the thermal treatment in the re-hardening process step, and thereby the hardness can be raised.

Hereinafter, an embodiment of the present invention will be explained with reference to the drawings. FIG. 1 shows an embodiment of a manufacturing method for an optical element of the present invention.

In this embodiment, a base material 3 having the alignment ability with an alignment layer 2 formed on a transparent substrate 1 is formed (base material preparing step, see FIG. 1A).

Figure 1B:

Next, a liquid crystal layer 4 is formed by applying a liquid crystal layer forming coating solution, prepared by dissolving a polymerizable liquid crystal material and a photo polymerization initiating agent in a solvent, on the base material 3 having the alignment ability, drying and eliminating the solvent, and applying a thermal treatment at the N-I transition point or lower (liquid crystal layer forming step, see FIG. 1B). The liquid crystal layer is provided with a liquid crystal regularity according to the function of the alignment layer 2.

Figure 1C:
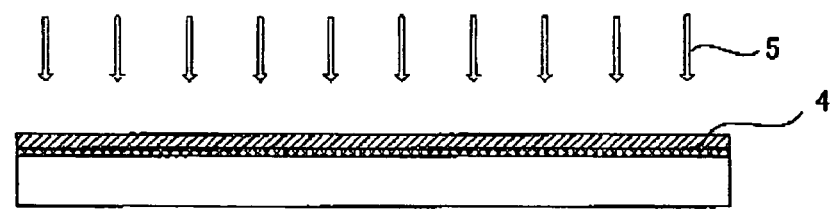
Figure 1D:
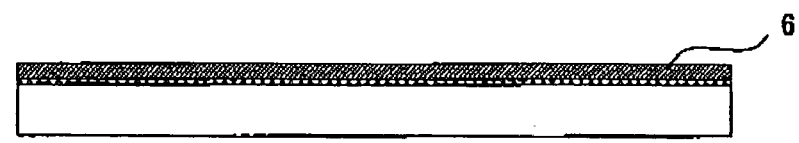

Then, an optical functional layer 6 is provided out of the liquid crystal layer 4 by irradiating an ultraviolet ray 5 to the above-mentioned liquid crystal layer 4 having the liquid crystal regularity at a room temperature or while heating so as to polymerize the polymerizable liquid crystal material in the liquid crystal layer 4 (optical functional layer forming step, see FIGS. 1C and 1D).

Figure 1E:
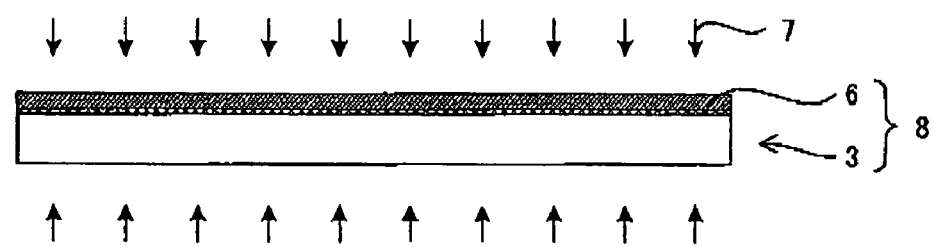
Figure 1F:

Next, a re-hardening process is carried out by applying heat 7 to the optical element 8, with the optical functional layer 6 formed as mentioned on the base material 3, for example, by maintaining the predetermined temperature by keeping in an oven (re-hardening process step, see FIG. 1E).

Thereby, a thermal treatment is provided so that the hardness of the optical functional layer 6 can be raised.

FIG. 2 shows another embodiment of a manufacturing method for an optical element of the present invention. FIG.

Figure 2A:
FIG. 2 is a diagram showing steps of another embodiment of a manufacturing method for an optical element according to the present invention.
Figure 2B:
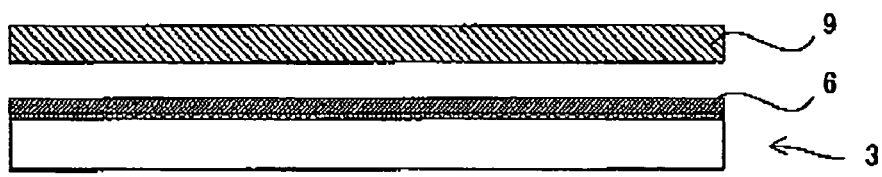

2A shows the state with the optical functional layer forming step of irradiating an ultraviolet ray shown in FIG. 1C already executed so that the optical functional layer 6 is formed on the base material 3 with the alignment layer 2 formed on the transparent base material 1. In this embodiment, a transfer step of transferring the optical functional layer 6 onto the member to be transferred 9 (see FIG. 2C) is carried out with a member to be transferred 9 disposed on the front surface side of the optical functional layer 6 (FIG. 2B).

Figure 2C:
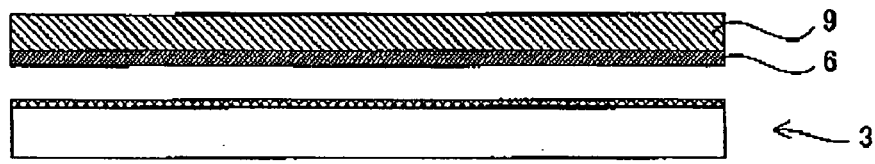
Figure 2D:
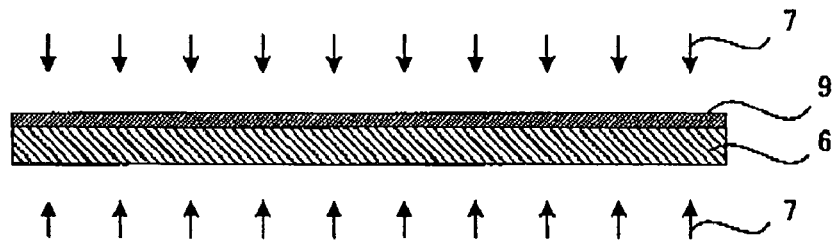
Figure 2E:

Similarly, a re-hardening process is executed by applying heat 7 to the optical functional layer 6 transferred on the member to be transferred 9 by maintaining at a predetermined temperature by keeping in for example an oven (re-hardening process step, see FIG. 2D). Thereby, an optical element 8 having an optical functional layer 6 with a high hardness can be obtained (see FIG. 2E).

Hereinafter, a manufacturing method for an optical element of the present invention as in the above-mentioned embodiments will be explained in detail for each step.

1. Base Material Preparing Step

At the time of producing an optical element of the present invention, first, a base material having the alignment ability is prepared. As the base material having the alignment ability, the base material itself having the alignment ability and one serving as the base material 3 having the alignment ability with the alignment layer 2 formed on the transparent substrate 1 as shown in FIG. 1 can be presented. Since they are same as those explained in the above-mentioned "A. Optical element" description, further explanation is omitted here.

2. Liquid Crystal Layer Forming Step

In the present invention, as shown in FIG. 1B, the liquid crystal layer 4 is formed on the above-mentioned base material 3 having the alignment ability.

The liquid crystal layer in the present invention is not particularly limited as long as it is a layer formed with a polymerizable liquid crystal material, capable of having a liquid crystal phase having various kinds of liquid crystal regularities.

As a method for forming such a liquid crystal layer, a liquid crystal layer forming composition including a polymerizable liquid crystal material is laminated on a base material so as to form a liquid crystal layer forming layer. As a method for forming the liquid crystal layer forming layer, for example, a method of preliminarily forming a dry film, or the like and laminating the same as the liquid crystal layer forming layer on the base material, a method of melting the liquid crystal layer forming composition and applying the same on the base material, or the like can also be employed. However, in the present invention, it is preferable to form the liquid crystal layer forming layer by dissolving the liquid crystal layer forming composition in a solvent, applying the same on the base material and eliminating the solvent because it is simpler in the steps than the other methods.

At the time, as the application method, a spin coating method, a roll coating method, a printing method, a soaking and taking out method, a curtain coating method (die coating method), or the like can be presented.

Accordingly, after application of the liquid crystal layer forming coating solution, the solvent is eliminated. As the method for eliminating the solvent, for example, a reduced pressure elimination or heating elimination, or a method of combining thereof, or the like can be executed. By eliminating the solvent, the liquid crystal layer forming layer can be formed.

In the present invention, the polymerizable liquid crystal material in the layer of the liquid crystal layer forming layer formed accordingly is provided as the liquid crystal layer in the state having a liquid crystal regularity according to the alignment ability on the base material surface. This is achieved in general by a method of applying a thermal treatment at the N-I transition point or lower, or the like. Here, the N-I transition point refers to the temperature of transition from the liquid crystal phase to the isotropic phase.

Since the polymerizable liquid crystal material, the chiral agent and the photo polymerization initiating agent used for the liquid crystal layer forming coating solution are same as those in the above-mentioned "A. optical element" explanation, further explanation is omitted here. Hereinafter, the solvent and the other additives used for the liquid crystal layer forming coating solution will be explained.

(Solvent)

A solvent used for the above-mentioned liquid crystal layer forming coating solution is not particularly limited as long as it is a solvent capable of dissolving the above-mentioned polymerizable liquid crystal material or the like, and without the risk of inhibiting the alignment ability on the base material having the alignment ability.

Specifically, one kind or two or more kinds out of hydrocarbons such as a benzene, a toluene, a xylene, an n-butyl benzene, a diethyl benzene and a tetralin, ethers such as a methoxy benzene, a 1,2-dimethoxy benzene, and a diethylene glycol dimethyl ether, ketones such as an acetone, a methyl ethyl ketone, a methyl isobutyl ketone, a cyclohexanone and a 2,4-pentan dion, esters such as an ethyl acetate, an ethylene glycol monomethyl ether acetate, a propylene glycol monomethyl ether acetate, a propylene glycol monoethyl ether acetate and a γ-butylolactone, amide based solvents such as a 2-pyrrolidone, an N-methyl-2-pyrrolidone, a dimethyl formamide and a dimethyl acetamide, halogen based solvents such as a chloroform, a dichloro methane, a carbon tetrachloride, a dichloro ethane, a tetrachloro ethane, a trichloro ethylene, a tetrachloro ethylene, a chloro benzene and an orthodichloro benzene, alcohols such as a t-butyl alcohol, a diacetone alcohol, a glycerol, a monoacetin, an ethylene glycol, a triethylene glycol, a hexylene glycol, an ethylene glycol monomethyl ether, an ethyl cellosolve and a butyl cellosolve, phenols such as a phenol and a parachloro phenol, or the like can be used.

By use of only a solvent of a single kind, the solubility of the polymerizable liquid crystal material, or the like may be insufficient, or the substrate having the alignment ability may be corroded as mentioned above. However, according to use of a mixture of two or more kinds of the solvents, the problems can be avoided. Among the above-mentioned solvents, as those preferably used as a single solvent, the hydrocarbon based solvents and the glycol monoether acetate based solvents can be presented. As those preferably used as a solvent mixture, a mixture of the ethers or the ketones and the glycols can be presented. The solvent concentration cannot be specified on the whole since it depends on the solubility of the liquid crystal composition and the film thickness of the optical functional layer to be produced, but it is adjusted in general in a range of 1 to 60% by weight, preferably in a range of 3 to 40% by weight.

(Other Additives)

To the liquid crystal layer forming coating solution used in the present invention, compounds other than the above-mentioned may be added in a range not to deteriorate the purpose of the present invention. As the compounds to be added, for example, a polyester (meth)acrylate obtained by reacting a polyester prepolymer, obtained by condensing a polyhydric alcohol and a monobasic acid or a polybasic acid, with a (meth) acrylic acid; a polyurethane (meth) acrylate obtained by reacting a polyol group and a compound having two isocyanate groups with each other, and reacting the reaction product with a (meth)acrylic acid; a photo polymerizable compound such as an epoxy (meth) acrylate obtained by reacting an epoxy resin such as a bisphenol A type epoxy resin, a bisphenol F type epoxy resin, a novolak type epoxy resin, a polycarboxylic acid polyglycidyl ester, a polyol polyglycidyl ether, an aliphatic or alicyclic epoxy resin, an amine epoxy resin, a triphenol methane type epoxy resin and a dihydroxybenzene type epoxy res in, and a (meth) acrylic acid; a photo polymerizable liquid crystal compound having an acrylic group or a methacrylic group, or the like can be presented. The amount of these compounds with respect to the liquid crystal composition of the present invention can be selected in a range not to deteriorate the purpose of the present invention. In general, it is 40% by weight or less with respect to the liquid crystal composition of the present invention, preferably 20% by weight or less. By adding these compounds, the hardening property of the polymerizable liquid crystal material of the present invention can be improved, the mechanical strength of the optical functional layer to be obtained can be increased, and the stability thereof can be improved.

Moreover, to the above-mentioned liquid crystal layer forming coating solution, a surfactant, or the like may be added for facilitating the application. As the examples of the surfactant to be added, a cation based surfactant such as an imidazoline, a quaternary ammonium salt, an alkyl amine oxide and a polyamine derivative, an anion based surfactant such as a polyoxyethylene-polyoxypropylene condensation product, a primary or secondary alcohol ethoxylate, an alkyl phenol ethoxylate, a polyethylene glycol and an ester thereof, a lauryl sodium sulfate, a lauryl ammonium sulfate, lauryl amine sulfates, an alkyl substituted aromatic sulfonate, an alkyl phosphate and an aliphatic or aromatic formalin sulfonate condensation product, an amphoteric surfactant such as a lauryl amide propyl betaine and a lauryl amino betaine acetate, a non-ion based surfactant such as polyethylene glycol fatty acid esters and a polyoxy ethylene alkyl amine, a fluorine based surfactant such as a perfluoroalkyl sulfonate, a perfluoroalkyl carboxylate, a perfluoroalkyl ethylene oxide adduct, a perfluoroalkyl trimethyl ammonium salt, a perfluoroalkyl group-hydrophilic group comprising oligomer, a perfluoroalkyl-lipophilic group comprising oligomer and a perfluoroalkyl group comprising urethane, or the like can be presented.

The amount of the surfactant depends on the kind of the surfactant, the kind of the polymerizable liquid crystal material, the kind of the solvent, and the kind of the substrate having the alignment ability to have the solution application, but in general, it is in a range of 10 ppm by weight to 10% by weight with respect to the liquid crystal composition contained in the solution, preferably 100 ppm by weight to 5% by weight, more preferably 0.1% by weight to 1% by weight.

3. Optical Functional Layer Forming Step

In the present invention, by irradiating an active radioactive ray to the liquid crystal layer comprising the polymerizable liquid crystal material as the main component formed in the above-mentioned liquid crystal layer forming step at a room temperature or while heating, the liquid crystal layer can be hardened in the state having the liquid crystal regularity. Thereby, an optical functional layer having various kinds of the optical functions can be formed.

The active radioactive ray to be irradiated at the time is not particularly limited as long as it is a radioactive ray capable of polymerizing the polymerizable liquid crystal material, the polymerizable chiral agent, or the like. In general, from the viewpoint of the apparatus handling property, or the like, an ultraviolet ray or a visible ray is used, and an irradiation ray with a wavelength of 15 nm to 500 nm, preferably 250 nm to 450 nm, more preferably 300 nm to 400 nm is used.

As the light source of the irradiation light, a low pressure mercury lamp (a bactericidal lamp, a fluorescent chemical lamp, a black light), a high pressure discharge lamp (a high pressure mercury lamp, a metal halide lamp), a short arc discharge lamp (a super high pressure mercury lamp, a xenon lamp, a mercury xenon lamp), or the like can be presented as the examples. In particular, use of a metal halide lamp, a xenon lamp, a high pressure mercury lamp, or the like can be recommended.

An irradiating operation is carried out with the irradiation strength optionally adjusted depending on the composition of the polymerizable liquid crystal material comprising the liquid crystal layer and the amount of the photo polymerization initiating agent.

4. Transfer Step

In the present invention, as needed, after the above-mentioned optical functional layer forming step, a step of transferring the optical functional layer formed on the above-mentioned base material having the alignment ability onto the material to be transferred may be provided.

It can be carried out as needed for example in the case of using the optical functional layer in a combination with another layer, in the case the optical functional layer is formed preferably on a base material without flexibility but it is used on the film surface having flexibility at the time of use, or the like.

The transfer operation is carried out by contacting the surface of the material to be transferred with the surface of the optical functional layer formed in the above-mentioned optical functional layer forming step (see FIGS. 2B and 2C).

As the transfer method at the time, for example, a method of preliminarily forming an adhesive layer, on the surface of the material to be transferred or the surface of the above-mentioned optical functional layer, for the transfer by the adhesive force, a method of providing the alignment layer, or the like on the base material with an easily peeling property.

As a further effective method, a method of providing the surface hardness of the surface of the optical functional layer on the side contacted with the material to be transferred lower than the surface hardness on the base material side for transferring in this state, a method of providing the residual double bond ratio on the surface of the above-mentioned material to be transferred side of the optical functional layer higher than that of the above-mentioned base material side for transferring in this state, or the like can be presented. As a method for providing the polymerization degree on the front surface side in the optical functional layer lower than the polymerization degree of the base material side, a method of using a photo polymerization initiating agent having the oxygen dependency, of lowering the polymerization rate in the presence of the oxygen, in the above-mentioned polymerizable liquid crystal material for the polymerization in the condition that only the front surface side is contacted with an oxygen, or the like can be presented.

The material to be transferred used in the step can be selected optionally according to the application of the optical element to be used. However, since it is an optical element, in general, a transparent material, that is, a transparent substrate can be used preferably.

Since the transparent substrate is same as that explained in the above-mentioned "base material having the alignment ability", further explanation is omitted here.

5. Re-Hardening Process Step

In the present invention, after the above-mentioned optical functional layer forming step, or after the above-mentioned transfer step, a re-hardening process step of heating is executed.

That is, it is characteristic of a manufacturing method for an optical element of the present invention that a step of re-hardening process by heating an optical element having the base material prepared in the above-mentioned base material preparing step and the optical functional layer formed on the base material in the above-mentioned optical functional layer forming step, or an optical element having the material to be transferred and the optical functional layer transferred on the surface thereof in the case the transfer step is executed, at a temperature in a range of 150° C. to 260° C. As a preferable heating temperature, a range of 165° C. to 260° C., in particular a range of 180° C. to 260° C. can be presented.

In the present invention, in the case the re-hardening process is executed at a temperature lower than the above-mentioned temperature range, the hardness of the optical functional layer cannot be raised sufficiently, and thus it is not preferable. In the case the re-hardening process is executed at a temperature higher than the above-mentioned temperature range, the optical functional layer or the base material, further the member to be transferred, or the like may be damaged, and thus it is not preferable.

In the present invention, the time for executing the re-hardening process in the above-mentioned range, specifically, the passed time since having the optical functional layer in the above-mentioned temperature range is preferably 1 minute to 240 minutes. It is more preferably in a range of 30 minutes to 210 minutes, in particular in a range of 60 minutes to 180 minutes. In the case of a re-hardening process time shorter than the above-mentioned time, the hardness of the optical functional layer cannot be raised sufficiently, and thus it is not preferable. In the case of a re-hardening process time longer than the above-mentioned range, there is a risk of thermal deterioration to either of the optical functional layer or the supporting member, and thus it is not preferable.

The re-hardening process can be carried out using a common thermal treatment device such as an oven.

In the present invention, it is preferable that the re-hardening process step is carried out under the non-oxygen atmosphere. In the case the oxygen exists, a radical necessary at the time of the re-hardening process can be trapped by the oxygen so as to disturb effective execution of the re-hardening process.

Here, the non-oxygen atmosphere is not particularly limited as long as it is in a state with the oxygen scarcely existing, but specifically, preferably carried out under the nitrogen atmosphere. In the case of providing the non-oxygen atmosphere, a nitrogen atmosphere is preferable in terms of the cost, or the like.

6. Other Steps

In the present invention, it is also possible to execute the protection layer forming step after the above-mentioned optical functional layer forming step, and then execute the above-mentioned re-hardening process step. Moreover, it is also possible to execute the protection layer forming step after the re-hardening process step, and further execute the protection layer re-hardening process step.

By accordingly executing the re-hardening process step, that is, the thermal treatment after formation of the protection layer, or executing the re-hardening process step to each of the optical functional layer and the protection layer, the hardness of both the optical functional layer and the protection layer can be raised. Thereby, the hardness of the surface of the laminated member of the optical functional layer and the protection layer can be improved dramatically. Thereby, the accuracy of the optical device can be improved for the same reason as mentioned above in the case the optical element having such a laminated member of the optical functional layer and the protection layer is used in an optical device.

Such a protection layer can be formed by application of the protection layer forming coating solution, and a resin material explained in the above-mentioned "A. optical element" description can be used in general.

The present invention is not limited to the above-mentioned embodiments. The above-mentioned embodiments are merely examples, and any one having the substantially same structure as the technological idea described in the claims of the present invention and having the same effects can be included in the technological scope of the present invention.

EXAMPLES

Hereinafter, the present invention will be further explained below with reference to the examples.

A. Choresteric Layer (Preparation of the Liquid Crystal Layer Forming Coating Solution)

A liquid crystal layer forming coating solution was prepared by dissolving a powder mixture of a polymerizable liquid crystal material, a chiral agent and a photo polymerization initiating agent by a 100:5:5 (% by weight) ratios in a toluene so as to have a 30% by weight ratio. As the polymerizable liquid crystal material, the chiral agent and the photo polymerization initiating agent, the below-mentioned were used.

Polymerizable liquid crystal material: a polymerizable liquid crystal monomer represented by the below-mentioned chemical formula (5) having a polymerizable functional group at the end and providing a nematic liquid crystal property at 50° C. to 100° C.

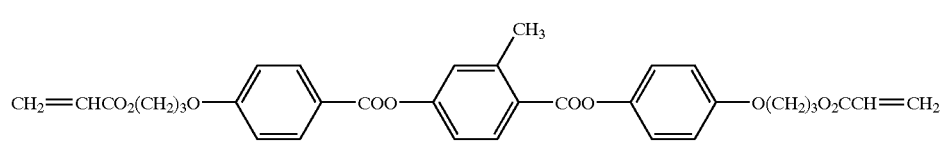

(5)

Chiral agent: a polymerizable chiral agent prepared by providing an acrylate via spacers at both ends of the methogen of a compound represented by the below-mentioned chemical formula (6) so as to enable polymerization

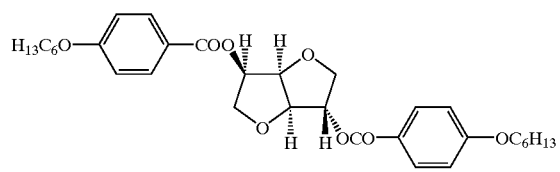

(6)

Photo polymerization initiating agent: IRG907 (product name) produced by Chiba Specialty Chemicals (Preparation of the Alignment Layer)

Next, an alignment layer was produced by spin coating an alignment layer solution comprising a polyimide as the main component on a 0.7 mm thickness glass substrate, evaporating the solvent, post-baking at 200° C., and rubbing by a known method. The alignment layer thickness was 0.1 μm.

(Formation of the Choresteric Layer)

The above-mentioned liquid crystal layer forming coating solution was spin-coated on the above-mentioned alignment layer. Next, after evaporating the solvent, the liquid crystal molecules were oriented by 80° C.×3 minutes. After confirming the selective reflection peculiar to the choresteric structure, a choresteric layer was formed by irradiating a UV (wavelength: 313 nm, 100 mJ/cm$^2$) for polymerization so as to provide a specimen. The choresteric layer film thickness was 3.6 μm.

After applying a thermal treatment to each of the specimen accordingly obtained by the below-mentioned thermal treatment conditions, they were cooled down to a room temperature by self-cooling and left for one day. These were provided as comparative examples 1 to 4 and examples 1 to 7 depending upon the thermal treatment conditions.

(Formation of the Protection Layer)

Using AC-5100 (an over-coating agent for an epoxy resin based color filter, product name, produced by Nissan Chemical Industries, Ltd. Kogyo, Corp.), a film was formed on the above-mentioned choresteric layer by a 2 μm film thickness, and a preliminary drying operation was executed on a hot plate at 60° C. for 10 minutes. Then, it was maintained at 150° C. for 30 minutes in a clean oven for post-baking. Thereafter, a thermal treatment was executed in the same manner as in the method explained for the choresteric layer formation description.

(Evaluation)

The Vickers hardness and the pencil hardness of each of the specimens of the above-mentioned comparative examples 1 to 4 and examples 1 to 7 were measured by the above-mentioned method. As to the measurement, those without the protection layer formation and those with the protection layer formed were measured for each of the comparative examples and examples. As to those with the protection layer formation, the cases of the choresteric layer thermal treatment condition at 150° C. and at 200° C. were measured. The thermal treatment conditions and results are shown in the below-mentioned table.

TABLE 1

|  | Thermal treatment condition (° C.) (Thermal treatment time: 30 minutes) | Vickers hardness | | | Pencil hardness | | |
| --- | --- | --- | --- | --- | --- | --- | --- |
|  |  | Without the protection layer | With the protection layer | | Without the protection layer | With the protection layer | |
|  |  |  | Base 150° C. | Base 200° C. |  | Base 150° C. | Base 200° C. |
| Comparative ex. 1 | None | 10 | 11 | 13 | 5B | 4B | 4B |
| Comparative ex. 2 | 80 | 15 | 17 | 22 | 3B | 2B | B |
| Comparative ex. 3 | 100 | 15 | 18 | 23 | 2B | 2B | B |
| Comparative ex. 4 | 120 | 15 | 20 | 26 | 2B | B | HB |
| Example 1 | 150 | 17 | 24 | 29 | B | B | HB |
| Example 2 | 160 | 24 | 31 | 37 | B | HB | HB |
| Example 3 | 180 | 30 | 42 | 29 | HB | H | H |
| Example 4 | 200 | 39 | 54 | 63 | HB | H | 2H |
| Example 5 | 220 | 50 | 62 | 67 | H | 2H | 2H |
| Example 6 | 240 | 56 | 68 | 72 | H | 2H | 3H |
| Example 7 | 260 | 61 | 73 | 78 | H | 2H | 3H |

B. Retardation Layer (Preparation of the Liquid Crystal Phase Forming Coating Solution and the Alignment Layer)

A liquid crystal layer forming coating solution was prepared in the same manner as in the above-mentioned item A except that the chiral agent was not used, and the polymerizable liquid crystal material and the photo polymerization initiating agent was provided by 100:5 (% by weight) ratios. Moreover, an alignment layer was prepared in the same manner as in the above-mentioned item A.

(Formation of the Retardation Layer and the Protection Layer)

A retardation layer and a protection layer were formed in the same manner as in the above-mentioned item A.

After applying a thermal treatment to each of the specimen accordingly obtained by the below-mentioned thermal treatment conditions, they were cooled down to a room temperature by self-cooling and left for one day. These were provided as comparative examples 1 to 4 and examples 1 to 7 depending upon the thermal treatment conditions.

(Evaluation)

The specimens were evaluated in the same manner as in the item A. The thermal treatment conditions and results are shown in the below-mentioned table.

TABLE 2

|  | Thermal treatment condition (° C.) (Thermal treatment time: 30 minutes) | Vickers hardness | | | Pencil hardness | | |
|---|---|---|---|---|---|---|---|
|  |  | Without the protection layer | With the protection layer | | Without the protection layer | With the protection layer | |
|  |  |  | Base 150° C. | Base 200° C. |  | Base 150° C. | Base 200° C. |
| Comparative ex. 1 | None | 10 | 11 | 13 | 5B | 4B | 4B |
| Comparative ex. 2 | 80 | 15 | 17 | 22 | 3B | 2B | B |
| Comparative ex. 3 | 100 | 15 | 18 | 23 | 2B | 2B | B |
| Comparative ex. 4 | 120 | 15 | 20 | 26 | 2B | B | HB |
| Example 1 | 150 | 17 | 24 | 29 | B | B | HB |
| Example 2 | 160 | 24 | 31 | 37 | B | HB | HB |
| Example 3 | 180 | 30 | 42 | 49 | HB | H | H |
| Example 4 | 200 | 39 | 54 | 63 | HB | H | 2H |
| Example 5 | 220 | 50 | 62 | 67 | H | 2H | 2H |
| Example 6 | 240 | 56 | 68 | 72 | H | 2H | 3H |
| Example 7 | 260 | 61 | 73 | 78 | H | 2H | 3H |

What is claimed is:

1. A manufacturing method for an optical element comprising:

a step of preparing a base material having the alignment ability, a step of forming a liquid crystal layer having a predetermined liquid crystal regularity by laminating a liquid crystal layer forming composition comprising at least a polymerizable liquid crystal material on the base material, a step of applying a thermal treatment to the liquid crystal layer at the N-I transition point or lower, a step of forming an optical functional layer by irradiating an active radioactive ray to the liquid crystal layer at a room temperature or while heating so as to provide an optical functional layer, and a step of re-hardening process by heating the optical functional layer at a temperature in a range of 150° C. to 260° C. for executing a re-hardening process.

2. The manufacturing method for an optional element according to claim 1, wherein the polymerizable liquid crystal material is a polymerizable monomer, and the predetermined liquid crystal regularity is a nematic regularity or a smectic regularity.

3. The manufacturing method for an optical element according to claim 1, wherein the polymerizable liquid crystal material is a polymerizable monomer and a polymerizable chiral agent, and the predetermined liquid crystal regularity is a choresteric regularity.

4. The manufacturing method for an optical element according to claim 1, wherein a photo polymerization initiating agent is contained in the liquid crystal layer forming composition.

5. The manufacturing method for an optical element according to claim 4, wherein the re-hardening process step is carried out under a non-oxygen atmosphere.

6. The manufacturing method for an optical element according to claim 5, wherein the re-hardening process step is carried out under a nitrogen atmosphere.

7. The manufacturing method for an optical element according to claim 1, wherein the liquid crystal layer forming composition is a liquid crystal layer forming coating solution using a solvent.

8. The manufacturing method for an optical element according to claim 1, wherein the heating time for the re-hardening process is in a range of 1 to 240 minutes.

9. The manufacturing method for an optical element according to claim 1, wherein a transfer step for transferring the optical functional layer formed on the base material having the alignment ability onto the material to be transferred is provided after the optical functional layer forming step.

10. The manufacturing method for an optical element according to claim 1, wherein a protection layer forming step is executed after the optical functional layer forming step, and then a re-hardening process step is executed.

* * * * *